(12) United States Patent
Maziere

(10) Patent No.: US 6,327,756 B1
(45) Date of Patent: Dec. 11, 2001

(54) FIXING CLAMP, ESPECIALLY FOR INSPECTION LAMPS

(75) Inventor: Laurent Maziere, Limoges (FR)

(73) Assignees: Legrand; Legrand SNC, both of Limoges (FR)

( * ) Notice: Subject to any disclaimer, the term of this patent is extended or adjusted under 35 U.S.C. 154(b) by 0 days.

(21) Appl. No.: 09/436,031

(22) Filed: Nov. 8, 1999

(30) Foreign Application Priority Data

Nov. 6, 1998 (FR) .................................................. 98 13985

(51) Int. Cl.[7] .............................. A44B 21/00; B25B 5/04; E04G 17/00
(52) U.S. Cl. ................................ 24/495; 24/455; 24/496; 24/568
(58) Field of Search .............................. 24/495, 496, 497, 24/455, 511, 568

(56) References Cited

U.S. PATENT DOCUMENTS

| 534,679 | * | 2/1895 | Atwood | .................................. 24/495 |
|---|---|---|---|---|
| 5,052,086 | * | 10/1991 | Nasuno | .................................. 24/511 |
| 5,369,851 | * | 12/1994 | Merkel | .................................. 24/495 |
| 5,464,182 | | 11/1995 | Stekelenburg . | |
| 5,581,900 | | 12/1996 | Payne . | |
| 5,678,284 | * | 10/1997 | Genero et al. | .......................... 24/495 |
| 5,799,404 | * | 9/1998 | Payne | .................................... 33/370 |
| 5,819,425 | | 10/1998 | Payne . | |

FOREIGN PATENT DOCUMENTS

| 0848398 | * | 9/1952 | (DE) | .................................... 24/495 |
|---|---|---|---|---|
| 0 445 014 | | 9/1991 | (EP) . | |

* cited by examiner

Primary Examiner—Victor N. Sakran
(74) Attorney, Agent, or Firm—Young & Thompson

(57) ABSTRACT

A fixing clamp has two pivoting jaws which are mobile relative to each other against the action of a return spring between an open position and a closed position. An operating lever accessible to a user is attached to one of the jaws. The two jaws are connected to each other by a spacer to which each jaw is articulated about a respective separate rotation axis. Applications include fixing clamps for inspection lamps.

24 Claims, 3 Drawing Sheets

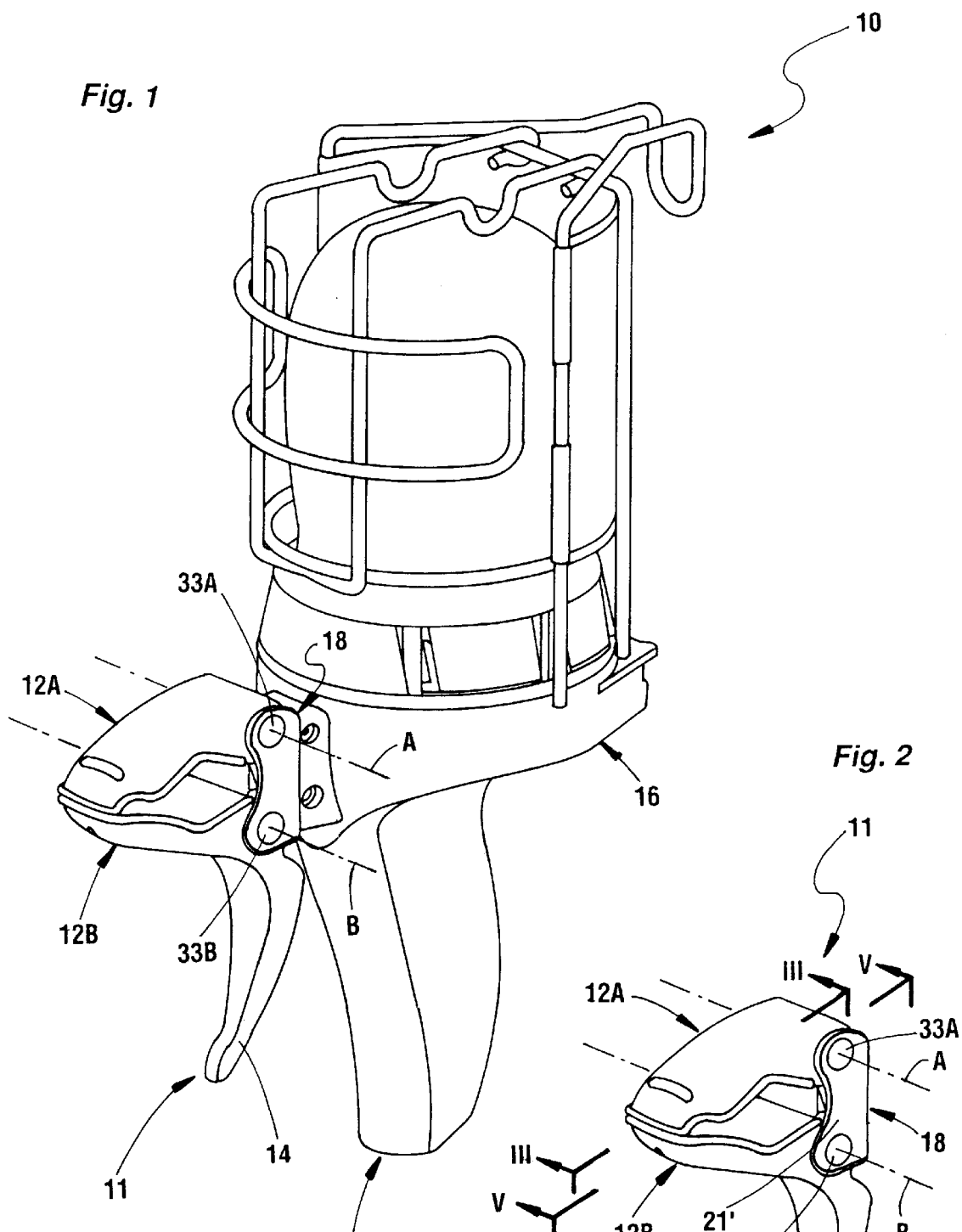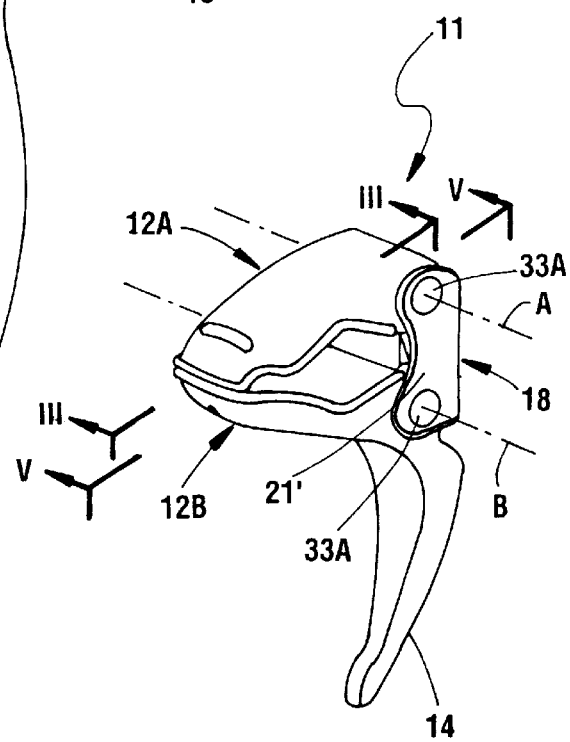

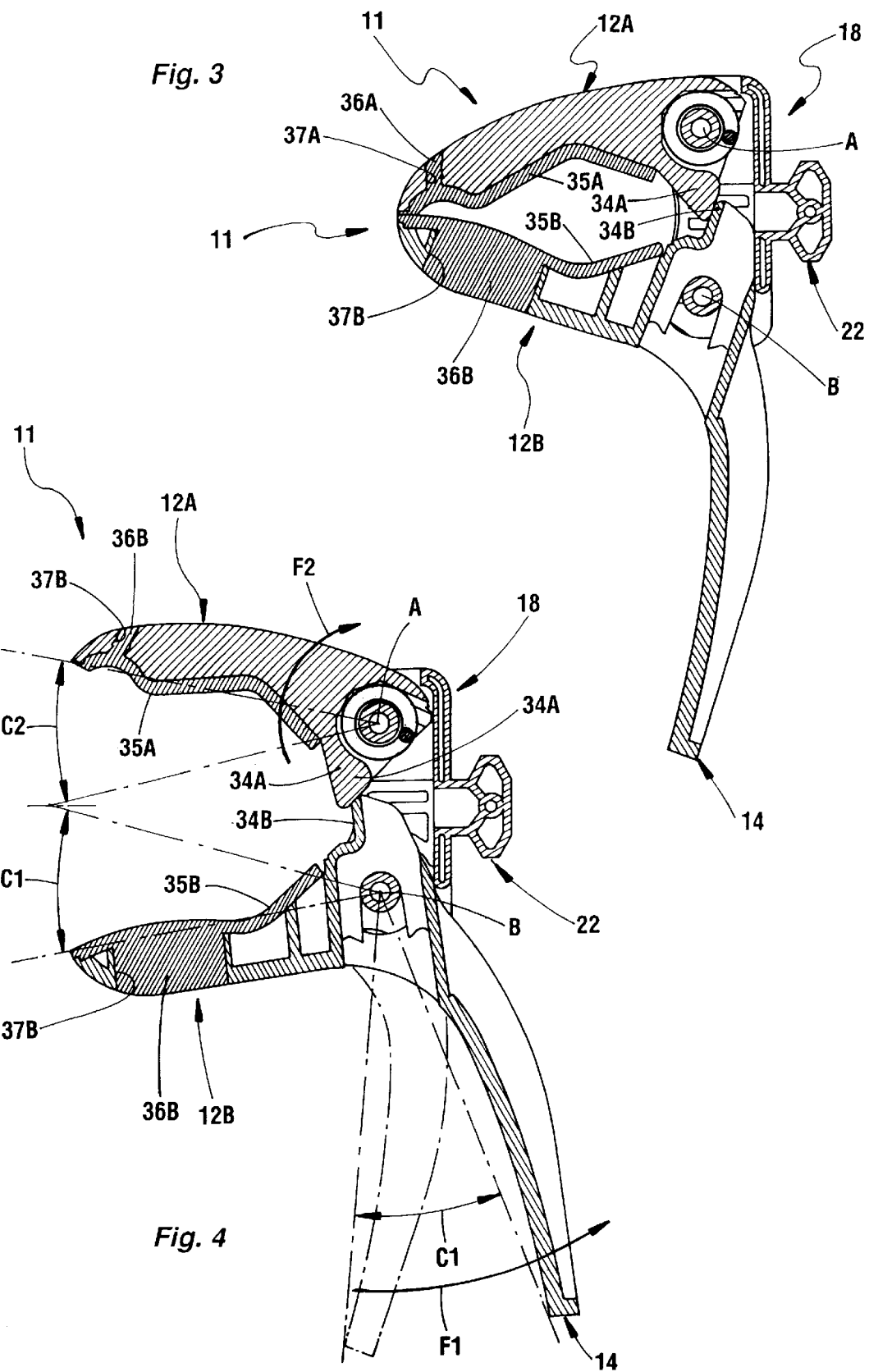

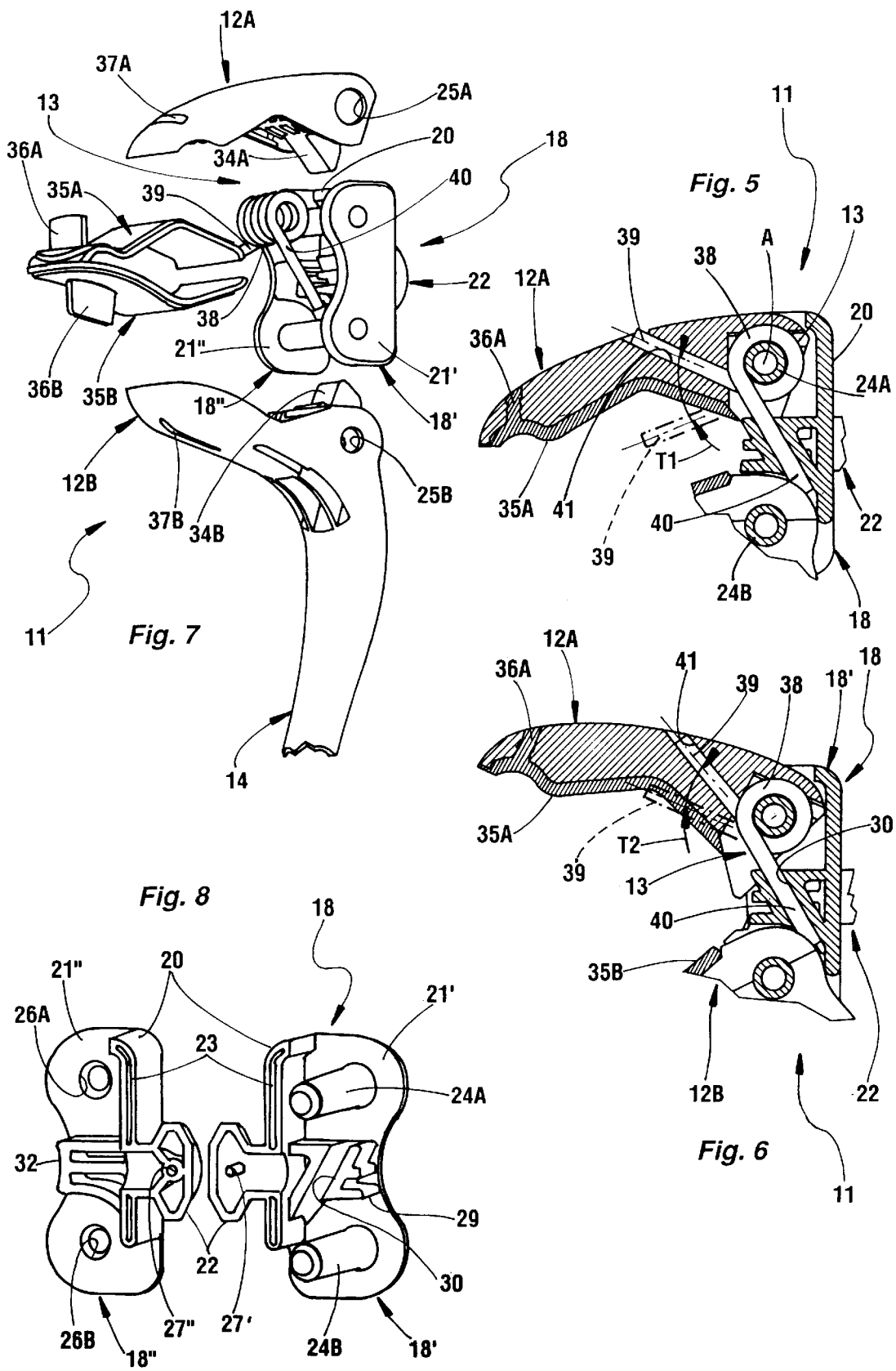

FIXING CLAMP, ESPECIALLY FOR INSPECTION LAMPS

BACKGROUND OF THE INVENTION

1. Field of the Invention

The present invention is generally concerned with fixing clamps for attaching an article of any kind to a support of any kind, whether the fixing clamp is permanently fixed to the article, of which it forms an integral part, or constitutes an accessory which is attached to the article only as and when required.

It is more particularly, although not necessarily exclusively, directed to the situation in which the article concerned is an inspection lamp, i.e. a mobile electrical lamp that a user can move as required to illuminate as well as possible a site in which the user is working.

2. Description of the Prior Art

To leave their hands free, it is important for the user to be able to put the inspection lamp down on, and preferably attach it to, a support of any kind, often of an improvised kind.

The fixing clamps commonly provided for this purpose usually have two jaws, both of which pivot, and which are therefore mobile relative to each other between an open position and a closed position, return spring means which spring-load the jaws towards their closed position, and an operating handle, generally a simple lever, for actuating the device which is accessible to the user and which is attached to one of the jaws, referred to hereinafter for convenience only as the bottom jaw, the other jaw being referred to hereinafter for convenience only as the top jaw.

Until now, and for simplicity, the two jaws have been directly articulated to each other about a common rotation axis.

This arrangement has been satisfactory and may continue to be so.

However, it has the drawback that it makes it difficult to meet the usual requirements in a convenient way.

One of these requirements is that, in the closed position of the jaws, the return spring means operating on the jaws must be non-negligibly prestressed.

It is important for the clamping force exerted by the jaws when they are engaged with a support to remain sufficient even if the support is relatively thin, for example a sheet of metal or glass or a ladder rung.

Another requirement is that the angle to which the jaws open must be sufficient, in practise at least 50°, so that they can be engaged with a relatively thick support, for example a plank.

Because the two jaws are articulated to each other and because the operating lever is coupled to the bottom jaw, all of the angle to which the jaws can open is reflected in the opening travel of the operating lever, which can make it difficult to handle for at least some users.

Because the force to be exerted on the operating lever inevitably increases as the jaws open, the force is frequently relatively high at the end of travel, which is uncomfortable for the user, if it originally has a non-negligible value to satisfy the aforementioned prestressing requirement, which from this point of view means that the two requirements to be satisfied are contradictory.

A general object of the present invention is an arrangement which overcomes the above problems and has other advantages.

SUMMARY OF THE INVENTION

To be more precise, the present invention consists in a fixing clamp including two pivoting jaws which are mobile relative to each other between an open position and a closed position, return spring means which spring-load the two jaws at all times toward their closed position, and an operating lever which is accessible to a user and which, for operating the clamp, is attached to one of the jaws, referred to hereinafter for convenience as the bottom jaw, the other jaw being referred to hereinafter for convenience as the top jaw, in which clamp the two jaws are articulated to a spacer about separate rotation axes and include mutual bearing means such that pivoting of one of the jaws in one direction causes the other of the jaws to pivot in the opposite direction.

The above arrangements, which merely entail the provision of an additional component, mean that the opening travel of the operating lever is reduced by half for the same opening angle of the jaws, which advantageously makes the device easier to handle.

The angle to which the jaws can open is the sum of the angle by which each of them can open relative to the spacer linking them, and it is therefore doubled for the same angular opening capacity for the bottom jaw, on which the opening travel of the operating lever is directly dependent.

Well known in the art are clamps like the one described in U.S. Pat. No. 5,581,900 in which each of the two jaws pivots about its own axis and is attached to an operating lever operated by the user independently of the other jaw of the clamp.

Such clamps can be satisfactory in some applications, but do not amplify the angular travel of the operating lever.

According to one feature of the invention, the return spring means acting on the jaws can advantageously act between one jaw and the spacer linking them, rather than directly between the jaws.

As a result, for the same angular opening capacity of the jaws, and therefore for the same opening travel of the operating lever, the load on the return spring means is reduced by half, which, other things being equal, means that the return spring means can be prestressed to a greater degree in the closed position of the jaws, which is beneficial in terms of clamping them to a relatively thin support, and which makes the force to be overcome to open the jaws more constant, this force advantageously being deployed over a smaller range of operation of the spring means, which is more comfortable for the user.

Also, the smaller opening travel of the operating lever advantageously improves the ergonomics of the fixing clamp of the invention.

In a preferred embodiment of the invention, the return spring means are operative between the top jaw and the spacer and, at the end opposite their free end relative to their rotation axis, each jaw has a heel through which they bear on each other.

The opening of the top jaw is therefore simply the result of the opening of the bottom jaw, the bottom jaw pushing directly on the top jaw as a result of the force applied to the operating lever to which it is fastened.

Given the action of the return spring means, the respective heels of the two jaws are advantageously always in contact with each other, without any clearance.

Finally, in a preferred embodiment of the invention, the spacer is in two parts.

This simplifies its manufacture and the assembly of the device as a whole.

The part of the return spring means by which they are engaged with the spacer can advantageously be operative directly between the two parts of the spacer without it being necessary to attach any auxiliary part thereto to hold it in place.

Also, the central part of the spacer being freed up in this way, the heels through which the jaws bear on each other can advantageously lie substantially in the median plane of the jaws, which is beneficial from the point of view of centering the forces transmitted and therefore from the point of view of overall operating conditions.

The features and advantages of the invention will emerge further from the following description given by way of example and with reference to the accompanying diagrammatic drawings.

BRIEF DESCRIPTION OF THE DRAWINGS

FIG. 1 is a perspective view of a fixing clamp in accordance with the invention and of the article to which it is fitted, showing the closed position of the fixing clamp.

FIG. 2 is derived from FIG. 1 and is a perspective view of the fixing clamp shown in isolation.

FIG. 3 is a view in cross section taken along the line III—III in FIG. 2, to a larger scale and showing the closed position of the clamp.

FIG. 4 is a view in cross section analogous to that of FIG. 3, showing the open position of the clamp.

FIG. 5 is a partial view of the fixing clamp in accordance with the invention in cross section taken along the line V—V in FIG. 2 and shown in the closed position.

FIG. 6 is a partial view in cross section analogous to that of FIG. 5 for the open position of the clamp.

FIG. 7 is a partial exploded perspective view of the fixing clamp in accordance with the invention, showing the fixing clamp from below, with the spring constituting the return spring means associated with the jaws intentionally removed from the spacer.

FIG. 8 is an exploded perspective view of the two components of the spacer.

DETAILED DESCRIPTION OF THE PREFERRED EMBODIMENTS

The figures show, by way of example, the application of the invention to a situation in which the article concerned is an inspection lamp 10.

Because the inspection lamp 10 is not of itself relevant to the invention it is not described here.

Suffice to say that to enable it to be attached to a support of any kind, not shown, it is permanently or removably equipped with a fixing clamp 11.

In a manner that is well known in the art, the fixing clamp 11 includes, as described in more detail later, top and bottom jaws 12A, 12B which are both pivoted and which are therefore both mobile relative to each other between an open position (FIG. 4) and a closed position (FIGS. 1 to 3), return spring means 13 which spring-load the two jaws 12A, 12B toward their closed position, and an operating lever 14 which is accessible to the user, opposite a handle 15 which is part of the casing 16 of the inspection lamp 10 and, for operating the fixing clamp 11, is attached to one of the two jaws 12A, 12B, here the bottom jaw 12B.

According to the invention, the two jaws 12A, 12B are coupled by a spacer 18 to which they are articulated about respective separate rotation axes A, B and by means of which the fixing clamp 11 is attached to the casing 16 of the inspection lamp 10.

In the embodiment shown, the spacer 18 is a yoke which locally caps both jaws 12A, 12B at the rear, i.e. on the side opposite their free ends.

The spacer 18 is therefore U-shaped with a central part 20 and two parallel lateral flanges 21', 21" substantially perpendicular thereto.

In the embodiment shown, the central part 20 has a mushroom-shaped stud 22 projecting from its back for removably attaching the clamp to a boss on the casing 16 of the inspection lamp 10, these arrangements not being described here because they are not relevant to the present invention.

As in the embodiment shown, the spacer 18 is preferably in two parts 18', 18", of which its two lateral flanges 21', 21" are respectively part, and between which the central part 20 and the stud 22 are equally divided (FIG. 8).

In the embodiment shown, the two parts 18', 18" of the spacer 18 are in contact with each other in a junction plane parallel to the lateral flanges 21', 21" and substantially halfway between them.

As shown here, for example, the central portion 20 of the spacer 18 is reinforced by an internal armature 23.

In the embodiment shown, the lateral flange 21' of the spacer 18 has two integral spaced parallel stub axles 24A, 24B projecting from its inside surface to define the rotation axes A, B of the jaws 12A, 12B. The jaws 12A, 12B are mounted to pivot on the stub axles by means of respective openings 25A, 25B and the ends of the stub axles 24A, 24B engage in respective openings 26A, 26B in corresponding relationship on the associated lateral flange 21".

The stub axles 24A, 24B are therefore supported at both ends, which makes them mechanically strong.

By engaging in the associated openings 26A, 26B during assembly, they also contribute to positioning the parts of the assembly.

This positioning can be assisted by providing at least one projecting stud 27' on one of the parts 18', 18" and at least one housing 27' recessed into the other part 18', 18", in corresponding relationship with the stud 27' and adapted to engage the stud 27'.

In a different embodiment the stud 27' can be replaced by a rib, for example, and the housing 27' by a groove complementary to the rib. The rib and the groove can replace the internal armature 23, for example, in which case the internal armature 23 is eliminated.

In the embodiment shown, and for reasons that will emerge later, one of the two parts 18', 18", of the spacer 18, here its part 18', has an oblique groove 30 recessed into its inside surface, to be more precise into a boss 29 projecting from the inside surface of the corresponding lateral flange 21', between the stub axles 24A, 24B and level with the plane at which it joins onto the other part 18".

The other of the two parts 18', 18", and thus the part 18" in this example, has a boss 32 for closing the groove 30 projecting from the corresponding lateral flange 21", between the openings 26A, 26B.

In the embodiment shown, the stub axles 24A, 24B are hollow for fixing means 33A, 33B such as screws, for example, for positively fastening together the two parts 18', 18" of the spacer 18 to pass through.

In the embodiment shown, each of the two jaws 12A, 12B has a heel 34A, 34B on the opposite side of its rotation axis A, B to its free end, and through which they bear on each other.

As shown here, for example, the heel 34A, 34B on each of the two jaws 12A, 12B is substantially in line with their rotation axis A, B and is substantially at a right angle to their main part.

The heel 34A, 34B on each of the two jaws 12A, 12B is preferably substantially in their median plane, i.e. the plane perpendicular to their rotation axis A, B passing substantially through their middle area.

As shown here, each of the two jaws 12A, 12B preferably has an internal non-skid facing 35A, 35B.

In the embodiment shown, the non-skid facing 35A, 35B has a blade 36A, 36B projecting from its back which is a force-fit in a complementary housing 37A, 37B provided for this purpose in the jaw 12A, 12B concerned. This holds it in place.

The blade 36A on the top jaw 12A is substantially parallel to the rotation axes A, B.

The blade 36B on the bottom jaw 12B is substantially perpendicularly to the rotation axes A, B, however.

In an embodiment that is not shown, the non-skid facing 35A, 35B of the jaws 12A, 12B has a peripheral rim which clips over the outside of the jaw 12A, 12B and the jaws 12A, 12B have spaced lugs projecting laterally over which the non-skid facing 35A, 35B clips.

In the embodiment shown, the return spring means 13 are operative between one of the jaws 12A, 12B and the spacer 18.

As shown here, the return spring means 13 are preferably operative between the top jaw 12A and the spacer 18.

In the embodiment shown, the return spring means 13 are formed by a torsion spring having a helical middle part 38 which is housed in the jaw 12A, 12B concerned, and therefore in the top jaw 12A in this example, and two lateral branches 39, 40, one of which, here the branch 39, is engaged with the top jaw 12A by means of a bore 41 therein and the other of which, here the branch 40, is engaged with the spacer 18.

In practise, the corresponding branch 40 of the torsion spring constituting the return spring means 13 is simply engaged with the groove 30 on the inside of the spacer 18 at the junction between its two parts 18', 18".

When the clamp is assembled, the torsion spring constituting the return spring means 13 is fitted into the top jaw 12A with its branch 39 in the bore 41 therein.

The top jaw 12A fitted with the return spring means 13 in this way is then fitted over the stub axle 24A on the part 18' of the spacer 18 without the return spring means 13 being prestressed at all.

It is then placed in an intermediate open position in order to arm the torsion spring constituting the return spring means 13 and thereby enable the bottom jaw 12B to be inserted.

The bottom jaw 12B is then fitted, by engaging it over the stub axle 24B on the part 18' of the spacer 18 in a position in which its heel 34B is to the rear of the heel 34A of the top jaw 12A.

With the two jaws 12A, 12B in place in this way, all that remains is to close the spacer 18 by attaching its part 18" to its part 18' fitted with the jaws 12A, 12B.

If, as shown diagrammatically in chain-dotted line in FIG. 5, the two branches 39, 40 of the torsion spring constituting the return spring means 13 are at an angle of substantially 90° to each other when unstressed, the prestressing of the return spring means 13 in the closed position of the fixing clamp 11 in accordance with the invention corresponds to an additional torsion angle T1 of approximately 45°, for example.

In this closed position, the respective free ends of the two jaws 12A, 12B bear on each other.

When, in use, and as symbolized by an arrow F1 in FIG. 4, the operating lever 14 is actuated in the opening direction, it pivots through an angle C1 about the rotation axis B of the bottom jaw 12B to which it is attached and the bottom jaw 12B pivots through the same angle C1 in the same direction about the rotation axis B.

Because its heel 34B bears on the heel 34A of the top jaw 12A, as it pivots the bottom jaw 12B causes the top jaw 12A to pivot about its rotation axis A through an angle C2 which is substantially equal to the angle C1 but in the opposite direction, as symbolized by an arrow F2 in FIG. 4.

Accordingly, the opening travel of the operating lever 14 is substantially less than half the total opening angular travel of the fixing clamp 11 as a whole, between the free ends of its jaws 12A, 12B, which is substantially the sum of the angles C1, C2.

In the open position of the fixing clamp 11 of the invention, shown in FIG. 6, the branches 39, 40 of the torsion spring constituting the return spring means 13 are substantially aligned with each other.

In other words, from the closed position to the open position, the force applied to the return spring means 13 substantially corresponds to an additional torsion angle T2 which is substantially the same as the torsion angle T1.

Thus, corresponding to substantially half the total operating range of the return spring means 13, the intitial stressing of the return spring means 13 can advantageously be relatively high.

The foregoing description presupposes that the fixing clamp 11 of the invention is equipped with coupling means, in this instance the stud 22, for removably attaching it to any article to be fixed by it, here the inspection lamp 10.

It can instead be permanently attached to an article of this kind, however.

The present invention is not limited to the embodiment described and shown, but encompasses any variant execution thereof.

Furthermore, its field of application is not limited to the inspection lamps particularly referred to, but on the contrary extends to any article requiring to be fixed.

There is claimed:

1. A fixing clamp including two pivoting jaws mobile relative to each other between an open position and a closed position, return spring means for spring-loading said two jaws toward their closed position, and an operating lever accessible to a user and attached to one of said jaws, said two jaws being articulated to a spacer about separate rotation axes and include mutual bearing means such that pivoting of one of said jaws in one direction causes the other of said jaws to pivot in the opposite direction, said mutual bearing means being disposed on said jaws on an opposite side of their rotation axis to a free end thereof and comprising a respective heel on each of said jaws bearing against each other.

2. The fixing clamp claimed in claim 1 wherein said heel of each of said two jaws is substantially in line with the rotation axis of the respective jaw.

3. The fixing clamp claimed in claim 1 wherein said heel of each of said two jaws is substantially in a median plane thereof.

4. The fixing clamp claimed in claim 1 wherein said heel of each of said two jaws is substantially at a right angle to a main part of the respective jaw.

5. The fixing clamp claimed in claim 1 wherein said return spring means are operative between one of said jaws and said spacer.

6. The fixing clamp claimed in claim 5 wherein said return spring means are operative between said an upper one of said jaws and said spacer.

7. The fixing clamp claimed in claim 5 wherein said return spring means are formed by a torsion spring having a helical middle part which is housed in said one of said jaws and two lateral branches, one of said branches being engaged with said one jaw and the other said branches is engaged with said spacer.

8. The fixing clamp claimed in claim 7 wherein said spacer comprises two parts, each of said two lateral flanges of said spacer forms a respective one of said two parts and one of said two parts has a groove recessed in an inside surface thereof and the other of said branches of said torsion spring is engaged with said groove.

9. The fixing clamp claimed in claim 1 wherein said spacer comprises a yoke which locally caps both of said two jaws.

10. The fixing clamp claimed in claim 9 wherein said spacer comprises two parts and each of the two lateral flanges of said spacer forms a respective one of said two parts.

11. A fixing clamp as claimed in claim 1 including coupling means for removably attaching the fixing clamp to an article for fixing the article to a support.

12. A fixing clamp as claimed in claim 1, wherein the fixing clamp is incorporated into a portable article, for fixing the article to a support.

13. A fixing clamp comprising two pivoting jaws mobile relative to each other between an open jaw position and a closed jaw position, return spring means for spring loading said jaws toward the closed jaw position, an operating lever attached to a single one of said jaws and accessible to a user for operating the clamp, each of said jaws being articulated to a support member about separate rotation axes, said jaws having mutual bearing means for pivoting in opposite directions in response to application of force to the operating lever.

14. A fixing clamp according to claim 13, wherein each of said jaws has a free end, said mutual bearing means being defined by bearing portions of said jaws remote from said free ends.

15. A fixing clamp according to claim 14, wherein each of said bearing portions is substantially in line with the rotation axis of the respective jaw.

16. A fixing damp according to claim 14, wherein each of said jaws has a main portion substantially at a right angle to the respective bearing portion thereof.

17. A portable article comprising a handle and a fixing clamp including two pivoting jaws mobile relative to each other between an open jaw position and a closed jaw position, return spring means for spring loading said jaws toward the closed jaw position, an operating lever disposed opposite the handle and attached to one of said jaws and accessible to a user for operating the clamp, each of said jaws being articulated to a support member about separate rotation axes, said jaws having mutual bearing means for pivotingly opening the jaw in opposite directions in response to application of force to the operating lever in a direction generally toward the handle.

18. A fixing clamp according to claim 17, wherein each of said jaws has a free end, said mutual bearing means being defined by bearing portions of said jaws remote from said free ends.

19. A fixing clamp according to claim 18, wherein each of said bearing portions is substantially in line with the rotation axis of the respective jaw.

20. A fixing clamp according to claim 18, wherein each of said jaws has a main portion substantially at a right angle to the respective bearing portion thereof.

21. A fixing clamp comprising two pivoting jaws mobile relative to each other between an open jaw position and a closed jaw position, return spring means for spring loading said jaws toward the closed jaw position, an operating lever attached to one of said jaws and accessible to a user for operating the clamp, each of said jaws being articulated to a support member about separate rotation axes, said rotation axes being located relatively close to each other, jaws having mutual bearing means located between said rotation axes for pivoting the jaws in opposite directions in response to application of force to the operating lever.

22. A fixing clamp according to claim 21, wherein each of said jaws has a free end, said mutual bearing means being defined by bearing portions of said jaws remote from said free ends.

23. A fixing clamp according to claim 22, wherein each of said bearing portions is substantially in line with the rotation axis of the respective jaw.

24. A fixing clamp according to claim 22, wherein each of said jaws has a main portion substantially at a right angle to the respective bearing portion thereof.

\* \* \* \* \*